United States Patent
Taniguchi et al.

(10) Patent No.: US 9,150,946 B2
(45) Date of Patent: *Oct. 6, 2015

(54) HOT DIP GALVANIZED HIGH STRENGTH STEEL SHEET EXCELLENT IN PLATING ADHESION AND HOLE EXPANDABILITY AND METHOD OF PRODUCTION OF SAME

(75) Inventors: Hirokazu Taniguchi, Tokai (JP); Kenichiro Matsumura, Tokai (JP); Toshiki Hattori, Tokai (JP); Satoshi Kato, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/931,950

(22) Filed: Feb. 14, 2011

(65) Prior Publication Data

US 2011/0139317 A1 Jun. 16, 2011

Related U.S. Application Data

(62) Division of application No. 10/585,594, filed as application No. PCT/JP2005/000624 on Jan. 13, 2005, now abandoned.

(51) Int. Cl.
| | |
|---|---|
| C21D 1/26 | (2006.01) |
| C22C 38/06 | (2006.01) |
| B32B 15/01 | (2006.01) |
| C22C 38/02 | (2006.01) |
| C22C 38/04 | (2006.01) |
| C22C 38/12 | (2006.01) |
| C22C 38/14 | (2006.01) |
| C22C 38/18 | (2006.01) |
| C23C 2/02 | (2006.01) |
| C21D 8/02 | (2006.01) |

(52) U.S. Cl.
CPC .............. *C22C 38/06* (2013.01); *B32B 15/013* (2013.01); *C21D 8/0278* (2013.01); *C22C 38/02* (2013.01); *C22C 38/04* (2013.01); *C22C 38/12* (2013.01); *C22C 38/14* (2013.01); *C22C 38/18* (2013.01); *C23C 2/02* (2013.01); *C21D 8/0263* (2013.01); *C21D 2211/001* (2013.01); *C21D 2211/002* (2013.01); *C21D 2211/005* (2013.01); *C21D 2211/008* (2013.01)

(58) Field of Classification Search
CPC ....................................................... C22C 38/12
USPC .................................................. 148/537, 522
See application file for complete search history.

(56) References Cited

U.S. PATENT DOCUMENTS

| | | | |
|---|---|---|---|
| 6,423,426 B1 * | 7/2002 | Kobayashi et al. .......... 428/659 |
| 6,517,955 B1 * | 2/2003 | Takada et al. ................ 428/659 |
| 6,558,815 B1 | 5/2003 | Suzuki et al. | |
| 7,090,731 B2 * | 8/2006 | Kashima et al. ............. 148/320 |
| 7,396,420 B2 * | 7/2008 | Matsuoka et al. ........... 148/320 |
| 2003/0099857 A1 | 5/2003 | Nomura et al. | |
| 2003/0190493 A1 | 10/2003 | Nomura et al. | |
| 2007/0006948 A1 | 1/2007 | Nonaka et al. | |
| 2007/0095444 A1 | 5/2007 | Nonaka et al. | |
| 2007/0190353 A1 | 8/2007 | Taniguchi et al. | |

FOREIGN PATENT DOCUMENTS

| | | |
|---|---|---|
| CA | 2387322 | 12/2002 |
| CN | 1343262 A | 4/2002 |
| CN | 1412333 A | 4/2003 |
| CN | 100552073 C | 10/2009 |
| EP | 1160346 A1 | 12/2001 |
| EP | 1 512 760 | 3/2005 |
| EP | 1 291 448 B1 | 6/2006 |
| EP | 1 707 645 | 10/2006 |
| JP | 5271857 | 10/1993 |
| JP | 05331537 | 12/1993 |
| JP | 06108152 | 4/1994 |
| JP | 10130776 A * | 5/1998 |
| JP | 2962038 | 10/1999 |
| JP | 2000303158 A * | 10/2000 |
| JP | 2000-345288 | 12/2000 |
| JP | 2001003150 | 1/2001 |
| JP | 2003-013177 | 1/2003 |
| JP | 2003-13177 A | 1/2003 |
| JP | 2003-055751 A | 2/2003 |
| JP | 2003-73773 A | 3/2003 |
| JP | 2003-105486 | 4/2003 |
| JP | 2003-105491 A | 4/2003 |
| JP | 2003105491 A * | 4/2003 |

(Continued)

OTHER PUBLICATIONS

NPL: Machine translation of JP2000303158A, Oct. 2000.*

(Continued)

*Primary Examiner* — Jie Yang
(74) *Attorney, Agent, or Firm* — Kenyon & Kenyon LLP

(57) ABSTRACT

The present invention provides hot dip galvanized high strength steel sheet excellent in plating adhesion and hole expandability and a method of production of the same, that is, hot dip galvanization steel sheet excellent in plating adhesion and hole expandability containing, by mass %, C: 0.08 to 0.35%, Si: 1.0% or less, Mn: 0.8 to 3.5%, P: 0.03% or less, S: 0.03% or less, Al: 0.25 to 1.8%, Mo: 0.05 to 0.35%, and N: 0.010% or less and having a balance of Fe and unavoidable impurities, said hot dip galvanized high strength steel characterized in that the steel sheet has a metal structure having ferrite, bainite, by area percent, 0.5% to 10% of tempered martensite, and, by volume percent, 5% or more of residual austenite, and a method of production comprising annealing by a continuous annealing process at 680 to 930° C. in temperature, then cooling to the martensite transformation point or less, then hot dip galvanizing the steel during which heating the steel to 250 to 600° C., then hot dip galvanizing it.

10 Claims, No Drawings

(56) References Cited

FOREIGN PATENT DOCUMENTS

| | | | |
|---|---|---|---|
| JP | 2003-193193 | | 7/2003 |
| JP | 2003-239040 | A | 8/2003 |
| JP | 2003239040 | A * | 8/2003 |
| JP | 3587116 | | 11/2004 |
| JP | 2005-200690 | | 7/2005 |
| JP | 2001-207235 | | 7/2007 |
| TW | 565621 | B | 12/2003 |
| WO | WO 02/101112 | A2 | 12/2002 |

OTHER PUBLICATIONS

NPL: English machine translation of JP2003105491A Apr. 2003.*
NPL: machine translation of JP2003239040A Aug. 2003.*
Machine translation of JP10130776A, May 1998.*
European Search Report dated May 17, 2011 issued in corresponding European Application No. 05 70 3854.
De Cooman et al., "Mechanical Properties of Low Alloy Intercritically Annealed Cold Rolled Trip Sheet Steel Containing Retained Austenite", Canadian Metallurgical Quarterly, vol. 43, No. 1, Jan. 1, 2004, pp. 13-24, XP00931577.
Sugimoto et al., "Retained Austenite Characteristics and Stretch-Flangeability of HighStrength Low-Alloy TRIP Type Bainitic Sheet Steels", ISIJ International, Iron and Steel Institute of Japan, vol. 42, No. 4, 2002, pp. 450-455, XP001182012.
Canadian Office Action dated Apr. 7, 2009 issued in corresponding Canadian Application No. 2,552,963.
Taiwan Office Action dated Mar. 20, 2008 issued in corresponding Taiwan Application No. 094101146.
Japanese Office Action dated Oct. 20, 2009 issued in corresponding Japanese Application No. 2004-069368.
Final Office Action dated Mar. 7, 2014 issued in U.S. Appl. No. 10/591,919.
Final Office Action dated Sep. 17, 2013 issued in U.S. Appl. No. 10/591,919.
Non-Final Office Action dated Jun. 5, 2013 issued in U.S. Appl. No. 10/591,919.
Final Office Action dated Jun. 7, 2010 issued in U.S. Appl. No. 10/591,919.
Non-Final Office Action dated Jan. 5, 2010 issued in U.S. Appl. No. 10/591,919.

* cited by examiner

HOT DIP GALVANIZED HIGH STRENGTH STEEL SHEET EXCELLENT IN PLATING ADHESION AND HOLE EXPANDABILITY AND METHOD OF PRODUCTION OF SAME

This application is a divisional application under 35 U.S.C. §120 and §121 of prior application Ser. No. 10/585,594 filed Jul. 10, 2006, now abandoned, which is a 35 U.S.C. §371 of PCT/JP2005/000624 filed Jan. 13, 2005, wherein PCT/JP2005/000624 was filed and published in the Japanese language.

TECHNICAL FIELD

The present invention relates to a hot dip galvanized high strength steel sheet excellent in plating adhesion and hole expandability and a method of production of the same.

BACKGROUND ART

In recent years, improved fuel economy of automobiles and reduced weight of chasses have been increasingly demanded. To reduce the weight, the need for high strength steel sheet excellent in tensile strength and yield strength has been rising. However, along with the rise in strength, this high strength steel sheet has become difficult to shape. In particular, steel materials have fallen in elongation. As opposed to this, recently, TRIP steel (high residual austenite steel) high in both strength and elongation has come to be used for the frame members of automobiles.

However, conventional TRIP steel contains over 1% of Si, so there are the problems that the plating is difficult to uniformly adhere and the hot dip galvanization ability is poor. For this reason, hot dip galvanized high strength steel sheet reduced in the amount of Si and containing Al as an alternative has been proposed in Japan Patent No. 2962038 and Japanese Patent Publication (A) No. 2003-105486. However, the former continues to have a problem in the plating adhesion since the Si content is a relatively high amount of 0.53% or more. Further, the latter reduces the Si content to less than 0.2% to improve the plating adhesion, but residual austenite is built into it due to the relatively high cooling rate, so there was the problem that the cooling rate could not be stably controlled and therefore the quality of the material became unstable.

Further, there are also quite a few members which are worked by burring to expand the worked hole part and form a flange. Steel sheet also having a hole expandability as an important characteristic is therefore being demanded. Conventional TRIP steel meeting this demand changes from residual austenite to martensite after induced plastic transformation and has a large hardness difference from ferrite, so there is the problem of an inferior hole expandability. Further, due to the demands from auto manufacturers and home electrical appliance manufacturers for making steel sheet rustproof, hot dip galvanized steel sheet has been spreading. In this way, various manufacturers have been changing over from conventional cold rolled steel sheet to surface treated steel sheet. Production setups have become necessary which shorten the production processes to enable large emergency and short delivery orders for surface treated steel sheet, in particular hot dip galvanized steel sheet, to be handled. However, in the case of high temperature annealed material or high strength steel sheet for producing the above-mentioned hot dip galvanization steel sheet, productivity is low due to the high temperature annealing. Therefore, in the case of large emergency orders/production of hot dip galvanized high strength steel sheet, there is the problem that production concentrates at the hot dip galvanization line having an annealing furnace before it and cannot be handled.

On the other hand, an ordinary continuous annealing line for annealing the sheet material of cold rolled steel sheet or electrogalvanized steel sheet generally has a high speed and high productivity. Regardless of this, there are problems that a change in production reduces the production load as explained above, sometimes there is no material being run, and the production line is idled. There was therefore the serious problem of an excess in production capacity.

DISCLOSURE OF THE INVENTION

The present invention has as its object to resolve the above-mentioned conventional problems and realize a hot dip galvanized high strength steel sheet excellent in plating adhesion and hole expandability and a method of production of the same on an industrial scale.

The inventors engaged in intensive studies on hot dip galvanized high strength steel sheet excellent in plating adhesion and hole expandability and a method of production of the same and as a result discovered that by optimizing the steel ingredients, that is, reducing the amount of Si and using Al as an alternative element, it is possible to improve the adhesion of hot dip galvanization, that by adding Mo to give the material superior properties of both strength and elongation, and that by cooling to the martensite transformation point or less before the hot dip galvanization process, then heating to the temperature required for plating, it is possible to industrially produce steel stable in quality and including residual austenite and tempered martensite and further to improve the hole expandability. That is, they discovered that by subjecting steel sheet of the ingredients designed based on the above discovery to recrystallization annealing in the continuous annealing process in the two ferrite/austenite phase range, then suitably overaging it in accordance with need, cooling to the martensite transformation point or less, then heating to the temperature required for plating for hot dip galvanization, a composite metal structure having ferrite as a main phase, having tempered martensite in an area percent of 0.5% to 10%, having a low temperature generated phase of residual austenite of a volume percent of 7% or more, and having a bainite phase is obtained and, in addition, the hole expandability is improved. Further, if performing the recrystallization annealing on the continuous annealing line and performing the hot dip galvanization on the continuous hot dip galvanization line, large emergency orders/production can also be handled. The present invention was made to solve the above problem and has as its gist the following.

(1) A hot dip galvanized high strength steel sheet excellent in plating adhesion and hole expandability containing C: 0.08 to 0.35%, Si: 1.0% or less, Mn: 0.8 to 3.5%, P: 0.03% or less, S: 0.03% or less, Al: 0.25 to 1.8%, Mo: 0.05 to 0.35%, and N: 0.010% or less and having a balance of Fe and unavoidable impurities, said hot dip galvanization steel sheet characterized in that said steel sheet has a metal structure having ferrite, bainite, by area ratio, 0.5% to 10% of tempered martensite, and, by volume percent, 5% or more of residual austenite.

(2) A method of production of a hot dip galvanized high strength steel sheet excellent in plating adhesion and hole expandability characterized by hot rolling a slab having the steel ingredients as set forth in (1), coiling the sheet at a temperature of 400 to 750° C., cooling, annealing by a continuous annealing process at a temperature of 680 to 930° C., cooling to the martensite transformation point or less, then hot dip galvanizing the sheet, during which heating to 250 to 600° C., then hot dip galvanizing it.

(3) A method of production of a hot dip galvanized high strength steel sheet excellent in plating adhesion and hole expandability as set forth in (2), characterized by cooling the steel sheet to the martensite transformation point or less of said continuous annealing process, then pickling it, or not pickling it, then pre-plating the steel sheet with one or more of Ni, Fe, Co, Sn, and Cu to 0.01 to 2.0 g/m² per side.

(4) A method of production of a hot dip galvanized high strength steel sheet excellent in plating adhesion and hole expandability as set forth in (2), characterized by alloying the galvanized layer after said hot dip galvanization process.

(5) A method of production of a hot dip galvanized high strength steel sheet excellent in plating adhesion and hole expandability as set forth in (2) or (4), characterized by post-treating said galvanized layer or galvannealed layer with one or more of chromate treatment, inorganic film coating, chemical conversion, and resin film coating.

(6) A hot dip galvanized high strength steel sheet excellent in plating adhesion and hole expandability characterized by comprising the hot dip galvanized high strength steel sheet of (1) further containing, by mass %, Ti: 0.01 to 0.3%, Nb: 0.01 to 0.3%, V: 0.01 to 0.3%, Cu: 1% or less, Ni: 1% or less, Cr: 1% or less, and B: 0.0001 to 0.0030%.

(7) A method of production of a hot dip galvanized high strength steel sheet excellent in plating adhesion and hole expandability as set forth in (2), characterized in that the hot dip galvanized high strength steel sheet of (1) further contains, by mass %, Ti: 0.01 to 0.3%, Nb: 0.01 to 0.3%, V: 0.01 to 0.3%, Cu: 1% or less, Ni: 1% or less, Cr: 1% or less, and B: 0.0001 to 0.0030%.

BEST MODE FOR WORKING THE INVENTION

First, the reasons for limitation of the ingredients and metal structure of the hot dip galvanized high strength steel sheet prescribed in the present invention will be explained.

C is an essential ingredient from the viewpoint of securing strength or as a basic element for stabilizing the austenite, but the amount added has to be adjusted in relation to the amount of Si depending on the application. When the tensile strength required is a relatively low one of about 400 to 800 MPa and ductility or hot dip galvanizability is stressed, together with a low amount of Si (for example, 0.2% or less), the amount of C is made 0.08% to 0.3%, preferably 0.1 to 0.22%. On the other hand, when the tensile strength required is 600 MPa or more or further a high 900 MPa and simultaneously workability is to be given and hot dip galvanizability not obstructing working is to be provided, together with a high amount of Si (for example, 0.2 to 1.0%), the amount of C is made 0.12 to 0.35%, preferably 0.15 to 0.25%.

Si is an effective element for securing strength, ductility, stabilizing austenite, and forming residual austenite. If the amount of addition is large, the hot dip galvanizability deteriorates, so less than 1.0% is added, but the amount of addition has to be adjusted depending on the application. When the tensile strength required is a relatively low 400 to 800 MPa or so and the ductility or hot dip galvanizability is stressed, Si is preferably added to less than 0.2%. When hot dip galvanizability is stressed, less than 0.1% is more preferable. When the tensile strength required is 600 MPa or more or further a high 900 MPa and simultaneously workability is to be given and hot dip galvanizability not obstructing work is to be provided, the amount of Si is made 0.2% to less than 1.0%. To secure hot dip galvanizability, the amount of Si is preferably 0.2% to less than 0.5%.

Mn is an element which has to be added from the viewpoint of securing the strength and in addition delays the formation of carbides and is an element required for the formation of residual austenite. If Mn is less than 0.8%, the strength is not satisfactory. Further, the formation of residual austenite becomes insufficient and the ductility deteriorates. Further, if Mn is over 3.5%, the martensite increases instead of residual austenite and invites a rise in strength. Due to this, the variation in the final product becomes greater. In addition, the ductility is insufficient. Therefore, the steel cannot be used as an industrial material. For this reason, the range of Mn was made 0.8 to 3.5%.

P is added in accordance with the level of strength required as an element raising the strength of the steel sheet, but if the amount of addition is large, it segregates at the grain boundary, so degrades the local ductility and simultaneously degrades the weldability, so the upper limit value of P was made 0.03%. Further, S is an element which forms MnS and degrades the local ductility and weldability. It is an element preferably not present in the steel, so the upper limit was made 0.03%.

Mo forms pearlite and reduces the residual austenite rate if less than 0.05%. Excessive Mo addition sometimes causes a drop in the ductility and deterioration of the chemical convertability, so 0.35% was made the upper limit. Preferably, the amount of addition of Mo is made 0.15% or less to obtain a high strength-ductility balance.

Al is an element required for causing residual austenite in the same way as Si. It is added to improve the plating adhesion in place of Si, promotes the formation of ferrite, and suppresses the formation of carbides so as to stabilize the austenite and simultaneously acts as a deoxidizing element. Stabilization of austenite requires addition of 0.25% or more of Al. On the other hand, even if Al is overly added, its effect becomes saturated and conversely the steel becomes embrittled. Simultaneously, the hot dip galvanizability is reduced. Therefore, the upper limit was made 1.8%.

N is an unavoidably included element, but when included in a large amount, not only is the aging effect deteriorated, but also the amount of deposition of AlN becomes greater and the effect of addition of Al is reduced, so 0.01% or less is preferably contained. Further, unnecessarily reducing the N increases the cost in the steelmaking process, so normally the amount of N is controlled to 0.0020% or more.

Further, in the present invention, in addition to the above ingredients, it is further possible to add one or more of Ti: 0.01 to 0.3%, Nb: 0.01 to 0.3%, V: 0.01 to 0.3%, Cu: 1% or less, Ni: 1% or less, Cr: 1% or less, and B: 0.0001 to 0.0030%. Ti, Nb, and V can be added for precipitation strengthening and for improvement of strength, but if 0.3% or more, the workability deteriorates. Further, the Cr, Ni, and Cu may also be added as strengthening elements, but if 1% or more, the ductility and chemical convertability deteriorate. Further, B may be added as an element for improving the local ductility and hole expandability, but if 0.0001% or less, the effect cannot be exhibited, while if 0.0030% or more, the elongation and plating adhesion deteriorate.

In the present invention, next, the metal structure explained with reference to the method of production is an extremely important requirement.

That is, the biggest feature in the metal structure of the hot dip galvanized high strength steel sheet according to the present invention is that the steel contains, by area percent, 0.5% to 10% of tempered martensite. This tempered martensite is obtained by taking the martensite formed in the cooling process after continuous annealing at 680 to 930° C. and heating it to 250 to 600° C., preferably 460 to 530° C., for continuous hot dip galvanization and tempering. If the amount of the tempered martensite is less than 0.5%, no improvement of the hole expansion rate is seen, while if over 10%, the difference in hardness between structures becomes too large and the workability falls. Further, by securing, by volume percent, 5% or more, preferably 7% or more, of residual austenite, the tensile strength×ductility is strikingly improved. Further, when the tensile strength required is 600 MPa or more or further a high 900 MPa and simultaneously workability is to be given, the residual austenite is preferably 7% or more. Further, this tempered martensite, ferrite, bainite, and, by volume percent, 5% or more of residual austenite form the main phase. By including these in steel sheet in a good balance, it is believed the workability and hole expandability are improved.

Next, the method of production of hot dip galvanized high strength steel sheet according to the present invention will be explained. A slab having the above-mentioned steel ingredients is hot rolled under ordinary conditions, then the sheet is coiled at a temperature of 400 to 750° C. The reason the coiling temperature was made the above range of temperature was to change the structure after hot rolling to pearlite with a small lamellae distance or a mixed structure of pearlite and bainite, to facilitate melting of the cementite in the annealing process, to suppress scale formation, to improve the descaling ability, to increase the hard phase, and to keep the cold rolling from becoming difficult. Therefore, low temperature coiling in the temperature range of 400 to 750° C. is preferable.

The thus coiled up hot rolled steel sheet is cold rolled under ordinary conditions to obtain cold rolled steel sheet. Next, this cold rolled steel sheet is recrystallization annealed in a coexistent two-phase temperature range of austenite and ferrite, that is, a temperature range of 680 to 930° C. If the annealing temperature is over 930° C., the structure in the steel sheet becomes a single austenite phase and the C in the austenite becomes sparse, so it is no longer possible to cause stable residual austenite to form in the later cooling. Therefore, the upper limit temperature was made 930° C. On the other hand, if less than 680° C., due to the insufficient solute C, the C of the austenite becomes insufficiently concentrated and the ratio of the residual austenite falls, so the lower limit temperature was made 680° C. The above annealed steel sheet is cooled to the martensite transformation point or less. The cooling means is not particularly limited and may be any of cooling by spraying water, cooling by evaporation, cooling by immersion in water, or cooling by gas jets. From the annealing to the cooling to the martensite transformation point or lower, overaging at a temperature of 300 to 500° C. is preferable. This overaging is meant to efficiently transform the austenite to bainite to secure a bainite phase, and concentrate the C in the residual austenite for stabilization, so holding at a temperature range of 300 to 500° C. for 60 seconds to 20 minutes is preferable.

Further, in the present invention, the steel is overaged, then cooled to the martensite transformation point or below to secure martensite. Note that the martensite transformation point Ms is found by Ms (° C.)=561−471×C (%)−33×Mn (%)−17×Ni (%)−17×Cr (%)−21×Mo (%).

The reason why the hole expandability is improved is not clear, but it is believed by annealing and cooling to the martensite transformation point or less, then heating the steel at a low temperature for hot dip galvanization, the balance of hardness between the soft structure and hard structure is improved, the local elongation is improved, and thereby the hole expandability is improved.

Further, in the present invention, the steel sheet cooled to the martensite transformation point or less is pickled as required before pre-plating. By performing this pickling before pre-plating, the steel sheet surface can be activated and the plating adhesion of the pre-plating can be improved. Further, the oxides of Si, Mn, etc. formed on the steel sheet surface in the continuous annealing process can be removed to improve the adhesion in the later hot dip galvanization. This pickling is 3.5 preferably performed in a pickling solution containing 2 to 20% of hydrochloric acid for 1 to 20 seconds. Note that this pickling may be followed by Ni flash plating. Further, when the cooling after recrystallization in the continuous annealing process is cooling by any of the means of cooling by spraying water, cooling by evaporation, or cooling by immersion in water, a pickling process is required at the outlet side of the continuous annealing process for removing the oxide film on the steel sheet surface formed during the continuous annealing or during the cooling, so a pickling facility is provided at the outlet side of the continuous annealing facility. Therefore, the oxides of Si, Mn, etc. formed on the steel sheet surface can be removed simultaneously with the removal of the oxide film on the steel sheet surface for greater efficiency. In this way, the pickling process may be efficiently performed by a facility attached to the continuous annealing process, but it may also be performed by a separately provided pickling line.

Further, in the present invention, to improve plating adhesion to the steel sheet cooled to the martensite transformation point or less, it is preferable to pre-plate it by one or more of Ni, Fe, Co, Sn, and Cu to 0.01 to 2.0 g/m$^2$ per side of the steel sheet, preferably 0.1 to 1.0 g/m$^2$. For the method of pre-plating, any of the methods of electroplating, dipping, and spray plating may be employed. If the amount of plating deposition is less than 0.01 g/m$^2$, the effect of improvement of adhesion by the pre-plating is not obtained, while if over 2.0 g/m$^2$, the cost rises, so the amount of plating was made 0.01 to 2.0 g/m$^2$ per side of the steel sheet.

The thus treated steel sheet is next hot dip galvanized, but the sheet is preferably pretreated before this hot dip galvanization process. This pretreatment means treatment to clean the surface of the steel sheet by a grinding brush etc. Note that this grinding brush preferably is a brush containing abrasive particles. A cleaning solution used is preferably warm water, a caustic soda solution, or both.

Further, to enable even large emergency orders/production to be handled, it is preferable that the existing continuous annealing process and hot dip galvanization process be separate lines, but the invention is not limited to this. In the case of separate lines, it is also possible to perform temper rolling or other shape correction to correct any loss of shape of the steel sheet in the continuous annealing furnace or divert the steel sheet to an electrolytic cleaning line to remove dirt etc. Further, it also becomes possible to predict the quality in advance since samples of the material can be obtained between the continuous annealing and hot dip galvanization.

The thus treated steel sheet is then galvanized by a hot dip galvanization process. In this hot dip galvanization process, the steel sheet is heated to a temperature at which the surface is activated or more, that is, a temperature range of 250 to 600° C. Note that if considering the difference in temperature between the galvanization bath and steel sheet, a temperature range of 460 to 530° C. is preferred. The heating means is not limited, but radiant tubes or induction heating is preferred. To enable even large emergency orders/production to be handled, the heating furnace of an existing continuous hot dip galvanization line can be utilized. Further, steel sheet is already recrystallization annealed by the above-mentioned continuous annealing process, so there are the advantages that the sheet can be run at a higher speed than when directly transferred from the cold rolling process to the hot dip galvanization process and therefore the productivity is also improved. This is preferable when handling large emergency orders/production.

Further, the galvanized steel sheet obtained by galvanization at said hot dip galvanization process may further be alloyed at the plating layer to make the plating structure dense and obtain a hard, tough plating layer by heat treating it in a temperature range of 470 to 600° C. to obtain hot dip galvannealed steel sheet. In particular, in the present invention, by alloying, it is possible to control the Fe concentration in the plating layer to for example 7 to 15 mass %.

Further, in the present invention, to improve the corrosion resistance and workability, the hot dip galvanized steel sheet or hot dip galvannealed steel sheet produced by the above process may be treated on its surface by one or more of chromate treatment, inorganic film coating, chemical conversion, or resin film coating.

Example 1

Steel slabs obtained by melting and casting steel having the compositions of ingredients shown in Table 1 in a vacuum melting furnace were reheated at 1200° C., then hot rolled at a temperature of 880° C. and finally rolled to produce hot rolled steel sheets. These were then cooled, coiled at a coiling temperature of 600° C., and held at that temperature for 1 hour for coiling heat treatment. The obtained hot rolled steel sheets were ground to remove the scale, cold rolled by a 70% reduction rate, then heated to a temperature of 770° C. using a continuous annealing simulator, then held at that temperature for 74 seconds for continuous annealing. Next, the sheets were cooled by 10° C./s to 450° C. and were processed by two methods of production, that is, the conventional method and the invention method, to produce galvanized steel sheets.

(1) Conventional Method

After cooling to 450° C., the sheets were hot dip galvanized and further were hot dip galvannealed at a temperature of 500° C. without pickling or pre-plating, were cooled to ordinary temperature, then were 1% temper rolled to obtain the final products. The mechanical properties, metal structures, hole expandabilities, plating adhesions, and other various characteristics of the products are shown in Table 2 (method of production i)).

(2) Method of Present Invention

After cooling to 450° C., the sheets were held at a temperature of 400° C. for 180 seconds for overaging, then cooled to the martensite transformation point or less, pickled by 5% hydrochloric acid, pre-plated with Ni to 0.5 g/m$^2$ per side of the sheet, heated to a temperature of 500° C., hot dip galvanized and further hot dip galvannealed, cooled to ordinary temperature, then 1% temper rolled to obtain the final products. The mechanical properties, metal structures, hole expandabilities, plating adhesions, and other various characteristics of the products are shown in Table 3 (method of production ii)).

Note that the test and analysis methods of the tensile strength (TS), hole expansion rate, metal structure, residual austenite, tempered martensite, plating adhesion, and plating appearance shown in Table 2 and Table 3 were as follows:

Tensile strength: Evaluated by L-direction tension of JIS No. 5 tensile test piece.

A TS of 540 MPa or more and a product of TSxEl (%) of 18,000 MPa or more was deemed passing.

Hole expansion rate: Japan Iron and Steel Federation standard, JFS T1001-1996

The hole expansion test method was employed. A 10 mmφ punched hole (die inside diameter of 10.3 mm, clearance of 12.5%) was expanded by a 60° vertex conical punch in the direction with the burr of the punched hole at the outside at a rate of 20 mm/min.

Hole expansion rate: $\lambda(\%)=\{D-Do\}\times 100$

D: Hole diameter when crack passes through sheet thickness (mm)

Do: Initial hole diameter (mm)

A hole expansion rate of 50% or more was deemed passing.

Metal structure: Observed under optical microscope, residual austenite rate measured by X-ray diffraction. Ferrite observed by Nital etching and martensite by repeller etching.

Tempered martensite rate: Tempered martensite was quantized by polishing a sample by repeller etching (alumina finish), immersing it in a corrosive solution (mixed solution of pure water, sodium pyrophosphite, ethyl alcohol, and picric acid) for 10 seconds, then again polishing it, rinsing it, then drying the sample by cold air. The structure of the dried sample was observed under a magnification of 1000× and a 100 μm×100 μm area was measured by a Luzex apparatus to determine the area % of the tempered martensite. Table 2 and Table 3 show the area percent of this tempered martensite as the "tempered martensite area %".

Residual austenite rate: A test sheet was chemically polished to ¼ thickness from its surface. The residual austenite was quantified from the integrated strength of the (200) and (210) planes of the ferrite by the MoKα-rays and the integrated strength of the (200), (220), and (311) planes of the austenite. A residual austenite rate of 5% or more was deemed "good". Table 2 and Table 3 show this residual austenite volume percent as the "residual γ vol %".

Plating adhesion: Evaluated from state of plating peeling of bent part in 60° V bending test.

Very good: Small plating peeling (peeling width less than 3 mm)

Good: Light peeling of extent not posing practical problem (peeling width of 3 mm to less than 7 mm)

Fair: Considerable amount of peeling observed (peeling width of 7 mm to less than 10 mm)

Poor: Extreme peeling (peeling width of 10 mm or more)

A plating adhesion of "very good" or "good" was deemed passing.

Plating appearance: Visual observation

Very good: No nonplating or unevenness, even appearance

Good: No nonplating, uneven appearance of extent not posing practical problem

Fair: Remarkable uneven appearance

Poor: Nonplating and remarkable uneven appearance

A plating appearance of "very good" or "good" was deemed passing.

TABLE 1

| Steel type | C | Si | Mn | P | S | Al | Mo | N | Selective element | | | | | | | Class |
|---|---|---|---|---|---|---|---|---|---|---|---|---|---|---|---|---|
| | | | | | | | | | Cu | Ni | Cr | Nb | Ti | V | B | |
| A | 0.080 | 0.016 | 1.47 | 0.022 | 0.010 | 1.117 | 0.155 | 0.002 | 0.0001 | 0.0002 | 0.0001 | 0.0220 | 0.0300 | 0.0002 | 0.0001 | Inv. range |
| B | 0.088 | 0.191 | 1.42 | 0.003 | 0.010 | 1.329 | 0.099 | 0.002 | 0.0001 | 0.0002 | 0.0001 | 0.0002 | 0.0048 | 0.0002 | 0.0001 | Inv. range |
| C | 0.098 | 0.069 | 2.80 | 0.007 | 0.010 | 0.552 | 0.140 | 0.003 | 0.0001 | 0.0002 | 0.0001 | 0.0280 | 0.0210 | 0.0002 | 0.0005 | Inv. range |
| D | 0.109 | 0.052 | 1.29 | 0.030 | 0.002 | 0.540 | 0.235 | 0.004 | 0.2400 | 0.0001 | 0.0002 | 0.0002 | 0.0002 | 0.0002 | 0.0001 | Inv. range |
| E | 0.133 | 0.026 | 2.56 | 0.002 | 0.010 | 0.852 | 0.050 | 0.003 | 0.0001 | 0.0002 | 0.4800 | 0.0002 | 0.0002 | 0.0002 | 0.0001 | Inv. range |
| F | 0.135 | 0.187 | 0.80 | 0.004 | 0.013 | 0.854 | 0.168 | 0.004 | 0.0002 | 0.0001 | 0.0002 | 0.0440 | 0.0002 | 0.0002 | 0.0006 | Inv. range |
| G | 0.136 | 0.072 | 1.91 | 0.001 | 0.012 | 1.504 | 0.111 | 0.002 | 0.0002 | 0.0001 | 0.0002 | 0.0002 | 0.0410 | 0.0002 | 0.0001 | Inv. range |
| H | 0.195 | 0.029 | 2.44 | 0.026 | 0.023 | 1.017 | 0.300 | 0.005 | 0.0001 | 0.0002 | 0.0001 | 0.0340 | 0.0001 | 0.0220 | 0.0001 | Inv. range |
| I | 0.184 | 0.128 | 1.38 | 0.027 | 0.019 | 0.840 | 0.102 | 0.002 | 0.0002 | 0.0001 | 0.0002 | 0.0002 | 0.0250 | 0.0230 | 0.0001 | Inv. range |
| J | 0.190 | 0.100 | 2.32 | 0.017 | 0.009 | 0.302 | 0.061 | 0.002 | 0.0002 | 0.1920 | 0.0002 | 0.0002 | 0.0002 | 0.0002 | 0.0001 | Inv. range |
| K | 0.229 | 0.067 | 1.54 | 0.006 | 0.001 | 0.300 | 0.198 | 0.002 | 0.0001 | 0.0002 | 0.0001 | 0.0420 | 0.0330 | 0.0002 | 0.0005 | Inv. range |
| L | 0.245 | 0.051 | 0.98 | 0.007 | 0.014 | 1.656 | 0.064 | 0.003 | 0.0002 | 0.0002 | 0.0001 | 0.0640 | 0.0002 | 0.0002 | 0.0001 | Inv. range |
| M | 0.261 | 0.140 | 1.58 | 0.002 | 0.002 | 0.388 | 0.066 | 0.010 | 0.0002 | 0.0001 | 0.0002 | 0.0002 | 0.0780 | 0.0002 | 0.0001 | Inv. range |
| N | 0.288 | 0.169 | 1.59 | 0.004 | 0.011 | 0.912 | 0.123 | 0.002 | 0.0002 | 0.0002 | 0.0001 | 0.0230 | 0.0250 | 0.0270 | 0.0005 | Inv. range |
| O | 0.291 | 0.013 | 1.76 | 0.017 | 0.023 | 1.024 | 0.125 | 0.003 | 0.0002 | 0.0001 | 0.0002 | 0.0002 | 0.0002 | 0.0670 | 0.0001 | Inv. range |
| P | 0.300 | 0.158 | 1.98 | 0.022 | 0.015 | 0.850 | 0.098 | 0.002 | 0.0002 | 0.0001 | 0.0002 | 0.0270 | 0.0002 | 0.0220 | 0.0005 | Inv. range |
| Q | 0.078 | 0.110 | 1.80 | 0.020 | 0.010 | 0.508 | 0.080 | 0.003 | 0.0001 | 0.0002 | 0.0002 | 0.0002 | 0.0002 | 0.0002 | 0.0001 | Comp. ex. |
| R | 0.324 | 0.100 | 2.00 | 0.020 | 0.020 | 0.070 | 0.124 | 0.001 | 0.0002 | 0.0002 | 0.0001 | 0.0330 | 0.0290 | 0.0002 | 0.0005 | Comp. ex. |
| S | 0.138 | 0.320 | 1.60 | 0.020 | 0.010 | 0.896 | 0.140 | 0.004 | 0.0001 | 0.0002 | 0.0001 | 0.3300 | 0.0002 | 0.0002 | 0.0001 | Comp. ex. |
| T | 0.129 | 0.120 | 0.40 | 0.030 | 0.020 | 0.767 | 0.060 | 0.004 | 0.0002 | 0.0002 | 0.0002 | 0.0002 | 0.3800 | 0.0002 | 0.0001 | Comp. ex. |
| U | 0.141 | 0.180 | 3.20 | 0.015 | 0.022 | 0.702 | 0.134 | 0.003 | 0.0002 | 0.0001 | 0.0002 | 0.0002 | 0.0002 | 0.0002 | 0.0038 | Comp. ex. |
| V | 0.134 | 0.040 | 1.70 | 0.030 | 0.020 | 0.185 | 0.080 | 0.004 | 0.0002 | 0.0001 | 0.0002 | 0.0002 | 0.0002 | 0.0410 | 0.0001 | Comp. ex. |
| W | 0.174 | 0.180 | 2.22 | 0.030 | 0.020 | 1.903 | 0.100 | 0.002 | 0.0001 | 0.0002 | 0.0001 | 0.0002 | 0.0002 | 0.0002 | 0.0001 | Comp. ex. |
| X | 0.124 | 0.110 | 1.70 | 0.030 | 0.020 | 0.534 | 0.025 | 0.003 | 0.0002 | 0.0001 | 0.0002 | 0.0230 | 0.0280 | 0.0002 | 0.0005 | Comp. ex. |
| Y | 0.155 | 0.140 | 2.02 | 0.030 | 0.020 | 0.612 | 0.320 | 0.004 | 0.0002 | 0.0002 | 0.0001 | 0.0260 | 0.0002 | 0.0240 | 0.0005 | Comp. ex. |

TABLE 2 method of production i)

| Experiment no. | Steel type | TS (MPa) | EL (%) | TS × EL | Residual γ volume (%) | Tempered martensite area (%) | Hole expansion rate (%) | Plating adhesion | Plating appearance | Class |
|---|---|---|---|---|---|---|---|---|---|---|
| 1 | A | 562 | 34 | 19040 | 8.7 | ≤0.1 | 52 | Very good | Very good | Comp. ex. |
| 2 | B | 590 | 33 | 19437 | 7.9 | ≤0.1 | 50 | Fair | Good | Comp. ex. |
| 3 | C | 603 | 33 | 19833 | 9.5 | ≤0.1 | 50 | Very good | Very good | Comp. ex. |
| 4 | D | 666 | 30 | 19950 | 5.1 | ≤0.1 | 48 | Very good | Very good | Comp. ex. |
| 5 | E | 607 | 34 | 20570 | 9.2 | ≤0.1 | 52 | Very good | Very good | Comp. ex. |
| 6 | F | 633 | 34 | 21488 | 11.5 | ≤0.1 | 51 | Fair | Good | Comp. ex. |
| 7 | G | 621 | 35 | 21700 | 12.4 | ≤0.1 | 52 | Very good | Very good | Comp. ex. |
| 8 | H | 632 | 30 | 18900 | 5.1 | ≤0.1 | 50 | Fair | Good | Comp. ex. |
| 9 | I | 646 | 34 | 21930 | 12.4 | ≤0.1 | 50 | Good | Very good | Comp. ex. |
| 10 | J | 625 | 34 | 21182 | 9.8 | ≤0.1 | 50 | Fair | Good | Comp. ex. |
| 11 | K | 702 | 28 | 19628 | 9.9 | ≤0.1 | 47 | Very good | Very good | Comp. ex. |
| 12 | L | 686 | 29 | 19865 | 9.4 | ≤0.1 | 47 | Very good | Very good | Comp. ex. |
| 13 | M | 714 | 27 | 19224 | 5.2 | ≤0.1 | 47 | Good | Very good | Comp. ex. |
| 14 | N | 796 | 26 | 20670 | 12.5 | ≤0.1 | 45 | Good | Very good | Comp. ex. |
| 15 | O | 634 | 33 | 20856 | 13.2 | ≤0.1 | 50 | Very good | Very good | Comp. ex. |
| 16 | P | 816 | 26 | 21190 | 12.4 | ≤0.1 | 45 | Good | Very good | Comp. ex. |
| 17 | Q | 525 | 26 | 13598 | 2.3 | ≤0.1 | 45 | Good | Very good | Comp. ex. |
| 18 | R | 796 | 19 | 15105 | 8.5 | ≤0.1 | 30 | Fair | Good | Comp. ex. |
| 19 | S | 619 | 20 | 12380 | 6.4 | ≤0.1 | 48 | Poor | Poor | Comp. ex. |
| 20 | T | 515 | 26 | 13364 | 2.2 | ≤0.1 | 45 | Good | Very good | Comp. ex. |
| 21 | U | 770 | 19 | 14592 | 5.4 | ≤0.1 | 21 | Fair | Poor | Comp. ex. |
| 22 | V | 502 | 31 | 15531 | 2.3 | ≤0.1 | 51 | Very good | Very good | Comp. ex. |
| 23 | W | 614 | 28 | 17192 | 8.9 | ≤0.1 | 53 | Poor | Fair | Comp. ex. |
| 24 | X | 531 | 35 | 18550 | 1.5 | ≤0.1 | 56 | Fair | Good | Comp. ex. |
| 25 | Y | 691 | 25 | 17225 | 2.1 | ≤0.1 | 41 | Fair | Fair | Comp. ex. |

TABLE 3 method of production ii)

| Experiment no. | Steel type | TS (MPa) | EL (%) | TS × EL | Residual γ volume (%) | Tempered martensite area (%) | Hole expansion rate (%) | Plating adhesion | Plating appearance | Class |
|---|---|---|---|---|---|---|---|---|---|---|
| 1 | A | 545 | 37 | 20388 | 9.7 | 4.7 | 64 | Very good | Very good | Inv. ex. |
| 2 | B | 566 | 36 | 20186 | 8.5 | 4.3 | 60 | Good | Very good | Inv. ex. |

TABLE 3-continued method of production ii)

| Experiment no. | Steel type | TS (MPa) | EL (%) | TS × EL | Residual γ volume (%) | Tempered martensite area (%) | Hole expansion rate (%) | Plating adhesion | Plating appearance | Class |
|---|---|---|---|---|---|---|---|---|---|---|
| 3 | C | 579 | 35 | 20249 | 10.4 | 7.5 | 61 | Very good | Very good | Inv. ex. |
| 4 | D | 646 | 33 | 21319 | 5.7 | 4.5 | 60 | Very good | Very good | Inv. ex. |
| 5 | E | 583 | 37 | 21397 | 9.9 | 6.2 | 63 | Very good | Very good | Inv. ex. |
| 6 | F | 608 | 36 | 21901 | 12.5 | 4.0 | 62 | Good | Very good | Inv. ex. |
| 7 | G | 602 | 39 | 23191 | 13.9 | 7.6 | 64 | Very good | Very good | Inv. ex. |
| 8 | H | 607 | 32 | 19658 | 5.5 | 9.1 | 60 | Good | Very good | Inv. ex. |
| 9 | I | 620 | 36 | 22351 | 13.5 | 6.4 | 60 | Very good | Very good | Inv. ex. |
| 10 | J | 606 | 37 | 22674 | 11.0 | 7.0 | 62 | Good | Very good | Inv. ex. |
| 11 | K | 674 | 30 | 20379 | 10.7 | 5.4 | 58 | Very good | Very good | Inv. ex. |
| 12 | L | 659 | 31 | 20244 | 10.2 | 3.5 | 58 | Very good | Very good | Inv. ex. |
| 13 | M | 693 | 30 | 20570 | 5.8 | 5.3 | 58 | Very good | very good | Inv. ex. |
| 14 | N | 764 | 28 | 21458 | 13.5 | 5.6 | 56 | Very good | Very good | Inv. ex. |
| 15 | O | 609 | 35 | 21290 | 14.4 | 6.3 | 60 | Very good | Very good | Inv. ex. |
| 16 | P | 792 | 29 | 22637 | 13.9 | 6.6 | 56 | Very good | Very good | Inv. ex. |
| 17 | Q | 504 | 28 | 14152 | 2.5 | 4.2 | 55 | Very good | Very good | Comp. ex. |
| 18 | R | 764 | 20 | 15390 | 9.3 | 10.5 | 38 | Good | Very good | Comp. ex. |
| 19 | S | 600 | 22 | 13209 | 7.2 | 5.0 | 60 | Good | Good | Comp. ex. |
| 20 | T | 494 | 28 | 13883 | 2.4 | 0.9 | 55 | Very good | Very good | Comp. ex. |
| 21 | U | 739 | 20 | 14887 | 5.9 | 10.3 | 27 | Good | Good | Comp. ex. |
| 22 | V | 487 | 34 | 16605 | 2.6 | 4.6 | 62 | Very good | Very good | Comp. ex. |
| 23 | W | 589 | 30 | 17825 | 9.6 | 6.8 | 65 | Good | Good | Comp. ex. |
| 24 | X | 510 | 37 | 18912 | 1.6 | 3.2 | 68 | Good | Good | Comp. ex. |
| 25 | Y | 670 | 27 | 17762 | 2.4 | 10.2 | 51 | Good | Good | Comp. ex. |

Example 2

Steel slabs obtained by melting and casting the steels of A, I, and P of the range of ingredients of the present invention described in Table 1 were reheated to 1200° C., then hot rolled at a temperature of 880° C. for final rolling to obtain hot rolled steel sheets. The steel sheets were coiled at a coiling temperature of 600° C. and held at that temperature for 1 hour for coiling heat treatment. The obtained hot rolled steel sheets were descaled by grinding and cold rolled by a reduction rate of 70%, then heated to a temperature of 770° C. using a continuous annealing simulator and held at that temperature for 74 seconds for continuous annealing, cooled by 10° C./s to 450° C., then overaged by being held at a temperature of 400° C. for 180 seconds, then cooled to the martensite transformation point or less. These steel sheets were subjected to the following five types of experiments:

Experiment 1 (invention example): pickling by 5% hydrochloric acid, Ni pre-plating to 0.5 g/m²

Experiment 2 (invention example): no pickling, Ni pre-plating to 0.5 g/m²

Experiment 3 (comparative example): pickling by 5% hydrochloric acid, Ni pre-plating to 0.005 g/m²

Experiment 4 (comparative example): pickling by 5% hydrochloric acid, no Ni pre-plating Experiment 5 (invention example): no pickling, no Ni pre-plating After this, the sheets were brush ground corresponding to surface cleaning at the inlet side of the continuous hot dip galvanization line, then heated to a temperature of 500° C. for hot dip galvanization and further hot dip galvannealing, cooled to ordinary temperature, then 1% temper rolled to obtain the final products. The characteristics of the plating adhesions and plating appearances of the products are shown in Table 4.

TABLE 4 differences in pickling and pre-plating conditions

| Experiment no. | Steel type | Plating adhesion | Plating appearance | Class |
|---|---|---|---|---|
| [1] | A | Very good | Very good | Inv. ex. |
| [2] | A | Very good | Good | Inv. ex. |
| [3] | A | Fair | Fair | Comp. ex. |
| [4] | A | Fair | Poor | Comp. ex. |
| [5] | A | Very good | Good | Inv. ex. |
| [1] | I | Very good | Very good | Inv. ex. |
| [2] | I | Very good | Good | Inv. ex. |
| [3] | I | Fair | Poor | Comp. ex. |
| [4] | I | Poor | Poor | Comp. ex. |
| [5] | I | Good | Good | Inv. ex. |
| [1] | P | Very good | Very good | Inv. ex. |
| [2] | P | Very good | Good | Inv. ex. |
| [3] | P | Fair | Poor | Comp. ex. |
| [4] | P | Poor | Poor | Comp. ex. |
| [5] | P | Good | Good | Inv. ex. |

In Example 1, the invention examples of Table 3 are improved in hole expandability due to the increase in tempered martensite compared with the comparative examples of the same experiment numbers of Table 2. In addition, the pickling and pre-plating improve the plating adhesion and plating appearance. The comparative examples of Table 3 are improved in plating adhesion and plating appearance by the pickling and pre-plating, but the ingredients are outside the scope of the present invention, so the TS, TSxEl, and hole expansion rate do not reach the passing values.

In the differences of pickling and pre-plating conditions of Example 2, from Experiment 1, Experiment 2, and Experiment 5, pre-plating greatly improves the plating adhesion and plating appearance and, further, pickling is preferably performed before pre-plating. From Experiment 3, if the amount of pre-plating is small, there is no effect. From Experiment 4, with just pickling, the properties conversely deteriorate. The reason why with just pickling, conversely the plating adhesion and plating appearance deteriorate is that the surface is overly activated and is heated by the heating process of the continuous hot dip galvanization in that state, so oxides of Si, Mn, etc. of the steel sheet are formed at the steel sheet surface and degrade the platability.

Example 3

Steel slabs obtained by melting and casting steel having the compositions of ingredients shown in Table 5 in a vacuum melting furnace were reheated at 1200° C., then hot rolled at a temperature of 880° C. and finally rolled to produce hot rolled steel sheets. These were then cooled, coiled at a coiling temperature of 600° C., and held at that temperature for 1 hour for coiling heat treatment. The obtained hot rolled steel sheets were ground to remove the scale, cold rolled by a 70% reduction rate, then heated to a temperature of 770° C. using a continuous annealing simulator, then held at that temperature for 7.4 seconds for continuous annealing. Next, the sheets were cooled by 10° C./s to 450° C. and were processed by two methods of production, that is, the conventional method and the invention method, to produce galvanized steel sheets.

(1) Conventional Method

After cooling to 450° C., the sheets were hot dip galvanized and further were hot dip galvannealed at a temperature of 500° C. without pickling or pre-plating, were cooled to ordinary temperature, then were 1% temper rolled to obtain the final products. The mechanical properties, metal structures, hole expandabilities, plating adhesions, and other various characteristics of the products are shown in Table 6 (method of production i)).

(2) Method of Present Invention

After cooling to 450° C., the sheets were held at a temperature of 400° C. for 180 seconds for overaging, then cooled to the martensite transformation point or less, pickled by 5% hydrochloric acid, pre-plated with Ni to 0.5 g/m² per side of the sheet, heated to a temperature of 500° C., hot dip galvanized and further hot dip galvannealed, cooled to ordinary temperature, then 1% temper rolled to obtain the final products. The mechanical properties, metal structures, hole expandabilities, plating adhesions, and other various characteristics of the products are shown in Table 7 (method of production ii)).

Note that the test and analysis methods of the tensile strength (TS), hole expansion rate, metal structure, residual austenite, tempered martensite, plating adhesion, and plating appearance shown in Table 6 and Table 7 were as follows:

Tensile strength: Evaluated by L-direction tension of JIS No. 5 tensile test piece.

A TS of 540 MPa or more and a product of TS×El (%) of 18,000 MPa or more was deemed passing.

Hole expansion rate: Japan Iron and Steel Federation standard, JFS T1001-1996

The hole expansion test method was employed. A 10 mmφ punched hole (die inside diameter of 10.3 mm, clearance of 12.5%) was expanded by a 60° vertex conical punch in the direction with the burr of the punched hole at the outside at a rate of 20 mm/min.

Hole expansion rate: $\lambda(\%) = \{D - D_o\} \times 100$

D: Hole diameter when crack passes through sheet thickness (mm)

Do: Initial hole diameter (mm)

A hole expansion rate of 50% or more was deemed passing.

Metal structure: Observed under optical microscope, residual austenite rate measured by X-ray diffraction. Ferrite observed by Nital etching and martensite by repeller etching.

Tempered martensite rate: Tempered martensite was quantized by polishing a sample by repeller etching (alumina finish), immersing it in a corrosive solution (mixed solution of pure water, sodium pyrophosphite, ethyl alcohol, and picric acid) for 10 seconds, then again polishing it, rinsing it, then drying the sample by cold air. The structure of the dried sample was observed under a magnification of 1000× and a 100 μm×100 μm area was measured by a Luzex apparatus to determine the area % of the tempered martensite. Table 6 and Table 7 show the area percent of this tempered martensite as the "tempered martensite area %".

Residual austenite rate: A test sheet was chemically polished to ¼ thickness from its surface. The residual austenite was quantified from the integrated strength of the (200) and (210) planes of the ferrite by the MoKα-rays and the integrated strength of the (200), (220), and (311) planes of the austenite. A residual austenite rate of 5% or more was deemed "good". Table 6 and Table 7 show this residual austenite volume percent as the "residual γ vol %".

Plating adhesion: Evaluated from state of plating peeling of bent part in 60° V bending test.

Very good: Small plating peeling (peeling width less than 3 mm)

Good: Light peeling of extent not posing practical problem (peeling width of 3 mm to less than 7 mm)

Fair: Considerable amount of peeling observed (peeling width of 7 mm to less than 10 mm)

Poor: Extreme peeling (peeling width of 10 mm or more)

A plating adhesion of very good or good was deemed passing.

Plating appearance: Visual observation

Very good: Even appearance with no nonplating or unevenness

Good: No nonplating and uneven appearance of an extent not posing practical problem Fair: Remarkable uneven appearance Poor: Nonplating and remarkable uneven appearance A plating appearance of "very good" or "good" was deemed passing.

TABLE 5

| Steel type | C | Si | Mn | P | S | Al | Mo | N | Optional element | | | | | | | Class |
| --- | --- | --- | --- | --- | --- | --- | --- | --- | --- | --- | --- | --- | --- | --- | --- | --- |
| | | | | | | | | | Cu | Ni | Cr | Nb | Ti | V | B | |
| A | 0.120 | 0.46 | 1.39 | 0.029 | 0.020 | 0.64 | 0.07 | 0.003 | 0.0000 | 0.0001 | 0.0000 | 0.0220 | 0.0250 | 0.0002 | 0.0001 | Inv. range |
| B | 0.183 | 0.42 | 1.37 | 0.002 | 0.010 | 1.72 | 0.09 | 0.003 | 0.0003 | 0.0000 | 0.0002 | 0.0290 | 0.0002 | 0.0002 | 0.0005 | Inv. range |
| C | 0.187 | 0.56 | 3.45 | 0.023 | 0.003 | 1.44 | 0.11 | 0.002 | 0.0002 | 0.0002 | 0.0000 | 0.0002 | 0.0310 | 0.0002 | 0.0001 | Inv. range |
| D | 0.198 | 0.25 | 2.57 | 0.011 | 0.012 | 0.99 | 0.32 | 0.003 | 0.0360 | 0.0210 | 0.0003 | 0.0002 | 0.0002 | 0.0002 | 0.0001 | Inv. range |
| E | 0.209 | 0.26 | 1.60 | 0.016 | 0.012 | 1.66 | 0.30 | 0.001 | 0.0002 | 0.0001 | 0.0003 | 0.0260 | 0.0380 | 0.0002 | 0.0005 | Inv. range |
| F | 0.221 | 0.32 | 1.72 | 0.020 | 0.024 | 1.26 | 0.25 | 0.002 | 0.0003 | 0.0003 | 0.0004 | 0.0002 | 0.0002 | 0.0300 | 0.0001 | Inv. range |
| G | 0.223 | 0.20 | 3.50 | 0.018 | 0.030 | 0.58 | 0.07 | 0.002 | 0.0002 | 0.0250 | 0.0002 | 0.0002 | 0.0002 | 0.0002 | 0.0001 | Inv. range |
| H | 0.225 | 0.53 | 2.34 | 0.021 | 0.013 | 1.42 | 0.13 | 0.003 | 0.0003 | 0.0002 | 0.0004 | 0.0270 | 0.0002 | 0.0330 | 0.0001 | Inv. range |
| I | 0.253 | 0.80 | 1.46 | 0.017 | 0.012 | 1.60 | 0.11 | 0.010 | 0.0001 | 0.0002 | 0.0001 | 0.0002 | 0.0250 | 0.0210 | 0.0001 | Inv. range |

TABLE 5-continued

| Steel type | C | Si | Mn | P | S | Al | Mo | N | Cu | Ni | Cr | Nb | Ti | V | B | Class |
|---|---|---|---|---|---|---|---|---|---|---|---|---|---|---|---|---|
| J | 0.253 | 0.30 | 2.80 | 0.022 | 0.004 | 0.81 | 0.05 | 0.000 | 0.0002 | 0.0002 | 0.0002 | 0.0002 | 0.0002 | 0.0002 | 0.0005 | Inv. range |
| K | 0.296 | 0.49 | 3.15 | 0.019 | 0.019 | 0.77 | 0.19 | 0.003 | 0.0002 | 0.0001 | 0.0002 | 0.0002 | 0.0002 | 0.0002 | 0.0001 | Inv. range |
| L | 0.299 | 0.29 | 1.20 | 0.025 | 0.000 | 1.30 | 0.28 | 0.000 | 0.0003 | 0.0004 | 0.0000 | 0.0220 | 0.0240 | 0.0110 | 0.0001 | Inv. range |
| M | 0.309 | 0.45 | 1.32 | 0.022 | 0.026 | 0.90 | 0.35 | 0.003 | 0.0001 | 0.0003 | 0.0320 | 0.0002 | 0.0002 | 0.0002 | 0.0001 | Inv. range |
| N | 0.324 | 0.23 | 2.87 | 0.014 | 0.004 | 1.39 | 0.10 | 0.000 | 0.0003 | 0.0000 | 0.0002 | 0.0002 | 0.0240 | 0.0002 | 0.0001 | Inv. range |
| O | 0.336 | 0.44 | 2.19 | 0.006 | 0.001 | 0.76 | 0.30 | 0.000 | 0.0004 | 0.0000 | 0.0002 | 0.0260 | 0.0002 | 0.0190 | 0.0005 | Inv. range |
| P | 0.350 | 0.70 | 2.88 | 0.022 | 0.022 | 0.25 | 0.29 | 0.000 | 0.0001 | 0.0001 | 0.0001 | 0.0002 | 0.0002 | 0.0270 | 0.0005 | Inv. range |
| Q | 0.110 | 0.60 | 2.18 | 0.018 | 0.023 | 1.04 | 0.13 | 0.001 | 0.0001 | 0.0002 | 0.0002 | 0.0002 | 0.0410 | 0.0002 | 0.0001 | Comp. ex. |
| R | 0.390 | 0.30 | 1.59 | 0.026 | 0.011 | 1.68 | 0.33 | 0.002 | 0.0000 | 0.0003 | 0.0002 | 0.0230 | 0.3800 | 0.0002 | 0.0005 | Comp. ex. |
| S | 0.222 | 0.81 | 2.77 | 0.005 | 0.004 | 1.66 | 0.19 | 0.003 | 0.0003 | 0.0002 | 0.0002 | 0.0002 | 0.0002 | 0.3500 | 0.0001 | Comp. ex. |
| T | 0.317 | 0.38 | 0.71 | 0.025 | 0.005 | 0.64 | 0.19 | 0.001 | 0.0001 | 0.0002 | 0.0002 | 0.0002 | 0.0220 | 0.0260 | 0.0001 | Comp. ex. |
| U | 0.293 | 0.23 | 3.70 | 0.016 | 0.011 | 0.86 | 0.12 | 0.002 | 0.0002 | 0.0002 | 0.0002 | 0.3600 | 0.0220 | 0.0002 | 0.0005 | Comp. ex. |
| V | 0.186 | 0.27 | 1.73 | 0.002 | 0.025 | 0.23 | 0.10 | 0.003 | 0.0001 | 0.0001 | 0.0003 | 0.0280 | 0.0002 | 0.0250 | 0.0001 | Comp. ex. |
| W | 0.261 | 0.26 | 1.32 | 0.006 | 0.018 | 1.83 | 0.20 | 0.001 | 0.0001 | 0.0000 | 0.0003 | 0.0002 | 0.0002 | 0.0002 | 0.0036 | Comp. ex. |
| X | 0.244 | 0.24 | 3.07 | 0.014 | 0.006 | 1.18 | 0.04 | 0.001 | 0.0002 | 0.0003 | 0.0000 | 0.0220 | 0.0290 | 0.0002 | 0.0001 | Comp. ex. |
| Y | 0.155 | 0.54 | 2.06 | 0.024 | 0.007 | 0.74 | 0.37 | 0.003 | 0.0001 | 0.0000 | 0.0004 | 0.0002 | 0.0002 | 0.0330 | 0.0005 | Comp. ex. |

TABLE 6 method of production i)

| Exp. no. | Steel type | TS (MPa) | EL (%) | TS × EL | Res. γ vol. (%) | Temp. mart. area (%) | Hole expansion rate (%) | Plating adhesion | Plating appear. | Class |
|---|---|---|---|---|---|---|---|---|---|---|
| 1 | A | 601 | 35 | 21035 | 9.5 | ≤0.1 | 55 | Fair | Fair | Comp. ex. |
| 2 | B | 666 | 33 | 21978 | 7.5 | ≤0.1 | 52 | Fair | Fair | Comp. ex. |
| 3 | C | 768 | 30 | 23040 | 11.4 | ≤0.1 | 48 | Fair | Poor | Comp. ex. |
| 4 | D | 770 | 26 | 20020 | 7.2 | ≤0.1 | 45 | Good | Good | Comp. ex. |
| 5 | E | 813 | 27 | 21951 | 7.3 | ≤0.1 | 45 | Good | Good | Comp. ex. |
| 6 | F | 807 | 25 | 20175 | 7.9 | ≤0.1 | 43 | Good | Good | Comp. ex. |
| 7 | G | 795 | 26 | 20670 | 8.1 | ≤0.1 | 45 | Fair | Fair | Comp. ex. |
| 8 | H | 827 | 28 | 23156 | 13.5 | ≤0.1 | 46 | Good | Fair | Comp. ex. |
| 9 | I | 845 | 27 | 22815 | 12.7 | ≤0.1 | 46 | Poor | Poor | Comp. ex. |
| 10 | J | 874 | 22 | 19228 | 7.1 | ≤0.1 | 41 | Good | Good | Comp. ex. |
| 11 | K | 856 | 26 | 22256 | 10.0 | ≤0.1 | 45 | Fair | Fair | Comp. ex. |
| 12 | L | 954 | 21 | 20034 | 7.2 | ≤0.1 | 41 | Good | Good | Comp. ex. |
| 13 | M | 938 | 21 | 19698 | 7.1 | ≤0.1 | 41 | Fair | Fair | Comp. ex. |
| 14 | N | 924 | 23 | 21252 | 10.2 | ≤0.1 | 41 | Fair | Fair | Comp. ex. |
| 15 | O | 965 | 20 | 19300 | 8.2 | ≤0.1 | 41 | Good | Good | Comp. ex. |
| 16 | P | 944 | 23 | 21712 | 11.5 | ≤0.1 | 42 | Fair | Poor | Comp. ex. |
| 17 | Q | 585 | 30 | 17550 | 3.2 | ≤0.1 | 48 | Fair | Poor | Comp. ex. |
| 18 | R | 984 | 18 | 17712 | 6.8 | ≤0.1 | 38 | Fair | Fair | Comp. ex. |
| 19 | S | 1025 | 17 | 17425 | 8.2 | ≤0.1 | 38 | Poor | Poor | Comp. ex. |
| 20 | T | 557 | 31 | 17267 | 2.1 | ≤0.1 | 47 | Good | Fair | Comp. ex. |
| 21 | U | 875 | 20 | 17500 | 7.4 | ≤0.1 | 37 | Fair | Fair | Comp. ex. |
| 22 | V | 662 | 25 | 16550 | 1.2 | ≤0.1 | 44 | Good | Good | Comp. ex. |
| 23 | W | 826 | 21 | 17346 | 10.2 | ≤0.1 | 39 | Fair | Poor | Comp. ex. |
| 24 | X | 722 | 23 | 16606 | 1.2 | ≤0.1 | 40 | Good | Good | Comp. ex. |
| 25 | Y | 615 | 24 | 14760 | 0.2 | ≤0.1 | 39 | Fair | Fair | Comp. ex. |

TABLE 7 method of production ii)

| Ex. no. | Steel type | TS (MPa) | EL (%) | TS × EL | Res. γ vol. (%) | Temp. marten. area (%) | Hole exp. rate (%) | Plating adhesion | Plating appearance | Class |
|---|---|---|---|---|---|---|---|---|---|---|
| 1 | A | 586 | 38 | 22150 | 10.5 | 4.3 | 67 | Very good | Very good | Inv. ex. |
| 2 | B | 629 | 35 | 22015 | 8.1 | 4.5 | 63 | Very good | Good | Inv. ex. |
| 3 | C | 741 | 32 | 23345 | 12.2 | 8.8 | 60 | Good | Good | Inv. ex. |
| 4 | D | 751 | 28 | 21081 | 7.9 | 8.4 | 56 | Very good | Very good | Inv. ex. |
| 5 | E | 768 | 29 | 21988 | 7.9 | 5.8 | 55 | Very good | Very good | Inv. ex. |
| 6 | F | 779 | 26 | 20442 | 8.5 | 6.0 | 53 | Very good | Very good | Inv. ex. |
| 7 | G | 775 | 28 | 21766 | 8.9 | 9.1 | 55 | Good | Good | Inv. ex. |
| 8 | H | 782 | 30 | 23195 | 14.6 | 7.3 | 56 | Very good | Very good | Inv. ex. |
| 9 | I | 815 | 28 | 23117 | 13.6 | 5.0 | 57 | Good | Good | Inv. ex. |

TABLE 7-continued method of production ii)

| Ex. no. | Steel type | TS (MPa) | EL (%) | TS × EL | Res. γ vol. (%) | Temp. marten. area (%) | Hole exp. rate (%) | Plating adhesion | Plating appearance | Class |
|---|---|---|---|---|---|---|---|---|---|---|
| 10 | J | 852 | 24 | 20247 | 7.8 | 8.5 | 50 | Very good | Very good | Inv. ex. |
| 11 | K | 809 | 28 | 22294 | 10.8 | 9.7 | 55 | Good | Good | Inv. ex. |
| 12 | L | 921 | 22 | 20299 | 7.7 | 5.9 | 50 | Very good | Very good | Inv. ex. |
| 13 | M | 915 | 23 | 20742 | 7.8 | 6.4 | 51 | Very good | Very good | Inv. ex. |
| 14 | N | 873 | 24 | 21288 | 11.0 | 9.4 | 51 | Good | Good | Inv. ex. |
| 15 | O | 931 | 21 | 19556 | 8.8 | 8.2 | 50 | Very good | Very good | Inv. ex. |
| 16 | P | 920 | 25 | 22863 | 12.7 | 9.6 | 52 | Good | Good | Inv. ex. |
| 17 | Q | 553 | 32 | 17580 | 3.5 | 6.6 | 58 | Very good | Very good | Comp. ex. |
| 18 | R | 950 | 19 | 17947 | 7.3 | 10.8 | 47 | Good | Good | Comp. ex. |
| 19 | S | 999 | 18 | 18349 | 9.0 | 8.7 | 48 | Good | Good | Comp. ex. |
| 20 | T | 526 | 33 | 17296 | 2.3 | 4.0 | 58 | Very good | Very good | Comp. ex. |
| 21 | U | 844 | 21 | 17732 | 7.9 | 11.0 | 46 | Good | Good | Comp. ex. |
| 22 | V | 645 | 27 | 17427 | 1.3 | 5.5 | 54 | Very good | Very good | Comp. ex. |
| 23 | W | 781 | 22 | 17375 | 11.0 | 4.9 | 48 | Good | Good | Comp. ex. |
| 24 | X | 697 | 24 | 16826 | 1.3 | 10.2 | 50 | Good | Good | Comp. ex. |
| 25 | Y | 600 | 26 | 15542 | 0.2 | 7.0 | 49 | Good | Good | Comp. ex. |

Example 4

Steel slabs obtained by melting and casting the steels of E, H, and P of the range of ingredients of the present invention described in Table 5 were reheated to 1200° C., then hot rolled at a temperature of 880° C. for final rolling to obtain hot rolled steel sheets. The steel sheets were coiled at a coiling temperature of 600° C. and held at that temperature for 1 hour for coiling heat treatment. The obtained hot rolled steel sheets were descaled by grinding and cold rolled by a reduction rate of 70%, then heated to a temperature of 770° C. using a continuous annealing simulator and held at that temperature for 74 seconds for continuous annealing, cooled by 10° C./s to 450° C., then overaged by being held at a temperature of 400° C. for 180 seconds, then cooled to the martensite transformation point or less. These steel sheets were subjected to the following five types of experiments:

Experiment 1 (invention example): Pickling by 5% hydrochloric acid, Ni pre-plating to 0.5 g/m$^2$ Experiment 2 (invention example): No pickling, Ni pre-plating to 0.5 g/m$^2$ Experiment 3 (comparative example): Pickling by 5% hydrochloric acid, Ni pre-plating to 0.005 g/m$^2$ Experiment 4 (comparative example): Pickling by 5% hydrochloric acid, no Ni pre-plating Experiment 5 (invention example): No pickling, no Ni pre-plating After this, the sheets were brush ground corresponding to surface cleaning at the inlet side of the continuous hot dip galvanization line, then heated to a temperature of 500° C. for hot dip galvanization and further hot dip galvannealing, cooled to ordinary temperature, then 1% temper rolled to obtain the final products. The characteristics of the plating adhesions and plating appearances of the products are shown in Table 8.

TABLE 8 difference in pickling and pre-plating conditions

| Experiment no. | Steel type | Plating adhesion | Plating appearance | Class |
|---|---|---|---|---|
| [1] | E | Very good | Very good | Inv. ex. |
| [2] | E | Very good | Good | Inv. ex. |
| [3] | E | Fair | Poor | Comp. ex. |
| [4] | E | Poor | Poor | Comp. ex. |
| [5] | E | Good | Good | Inv. ex. |
| [1] | H | Very good | Very good | Inv. ex. |
| [2] | H | Very good | Good | Inv. ex. |
| [3] | H | Poor | Poor | Comp. ex. |
| [4] | H | Poor | Poor | Comp. ex. |
| [5] | H | Good | Good | Inv. ex. |
| [1] | P | Good | Good | Inv. ex. |
| [2] | P | Good | Good | Inv. ex. |
| [3] | P | Poor | Poor | Comp. ex. |
| [4] | P | Poor | Poor | Comp. ex. |
| [5] | P | Good | Good | Inv. ex. |

In Example 3, the invention examples of Table 7 are improved in hole expandability due to the increase in tempered martensite compared with the comparative examples of the same experiment numbers of Table 6. In addition, the pickling and pre-plating improve the plating adhesion and plating appearance. The comparative examples of Table 3 are improved in plating adhesion and plating appearance by the pickling and pre-plating, but the ingredients are outside the scope of the present invention, so the TS, TSxEl, and hole expansion rate do not reach the passing values.

In the differences in pickling and pre-plating conditions of Example 4, from Experiment 1, Experiment 2, and Experiment 5, pre-plating greatly improves the plating adhesion and plating appearance and, further, pickling is preferably performed before pre-plating. From Experiment 3, if the amount of pre-plating is small, there is no effect. From Experiment 4, with just pickling, the properties conversely deteriorate. The reason why with just pickling, conversely the plating adhesion and plating appearance deteriorate is that the surface is overly activated and is heated by the heating process of the continuous hot dip galvanization in that state, so oxides of Si, Mn, etc. of the steel sheet are formed at the steel sheet surface and degrade the platability.

INDUSTRIAL APPLICABILITY

According to the present invention, it becomes possible to provide hot dip galvanized high strength steel sheet excellent in plating adhesion and hole expandability used in auto parts, household electric appliance parts, etc. and becomes possible to flexibly handle changes in product type, changes in production due to increase production at various manufacturers, and large emergency short delivery orders/production.

The invention claimed is:

1. A production method of a hot dip galvanized high strength steel sheet from a slab consisting of, by mass %,
C: 0.08 to 0.35%,
Si: less than 0.2%,
Mn: 0.8 to 3.5%,
P: 0.03% or less,
S: 0.03% or less,
Al: 0.25 to 1.8%,
Mo: 0.05 to 0.35%,
N: 0.010% or less,
Ti: 0.0002% or less,
optionally one or more of Nb: 0.01 to 0.3%, V: 0.01 to 0.3%, Cu: 1% or less,
Ni: 1% or less, Cr: 1% or less, or B: 0.0001 to 0.0030%, and
a balance of Fe and unavoidable impurities,
the method comprising the steps of:
hot rolling the slab to make a steel sheet, coiling the sheet at a temperature of 400 to 750° C., cold rolling the sheet, annealing the cold rolled sheet by a continuous annealing process at a temperature of 680 to 930° C., overaging the annealed sheet at a temperature of 300 to 500° C. for 60 seconds to 20 minutes, cooling the overaged sheet to the martensite transformation point or less, heating the cooled sheet to 250 to 600° C., then hot dip galvanizing the heated sheet,
wherein the hot dip galvanized sheet has by area percent, 3.5% to 10% of tempered martensite, and by volume percent, 7% or more of residual austenite.

2. The production method of a hot dip galvanized high strength steel sheet as set forth in claim 1, further comprising cooling the steel sheet to the martensite transformation point or less of said continuous annealing process, then pickling it, or not pickling it, then pre-plating the steel sheet with one or more of Ni, Fe, Co, Sn, and Cu to 0.01 to 2.0 g/m² per side.

3. The production method of a hot dip galvanized high strength steel sheet as set forth in claim 1, further comprising alloying the galvanized sheet obtained by said hot dip galvanization process.

4. The production method of a hot dip galvanized high strength steel sheet as set forth in claim 1, further comprising post-treating said galvanized sheet or galvannealed sheet with one or more of chromate treatment, inorganic film coating, chemical conversion, and resin film coating.

5. The production method of a hot dip galvanized high strength steel sheet as set forth in claim 1, wherein the slab contains, by mass %, Si: 0.191% or less.

6. The production method of a hot dip galvanized high strength steel sheet as set forth in claim 1, wherein the slab contains, by mass %, Si: 0.187% or less.

7. The production method of a hot dip galvanized high strength steel sheet as set forth in claim 1, wherein the slab contains, by mass %, Si: 0.169% or less.

8. The production method of a hot dip galvanized high strength steel sheet as set forth in claim 1, wherein the slab contains, by mass %, Si: 0.1% or less.

9. The production method of a hot dip galvanized high strength steel sheet as set forth in claim 1, wherein the hot dip galvanized sheet has by volume percent, 10% or more of residual austenite.

10. A production method of a hot dip galvanized high strength steel sheet from a slab consisting of, by mass %,
C: 0.08 to 0.35%,
Si: less than 0.2%,
Mn: 0.8 to 3.5%,
P: 0.03% or less,
S: 0.03% or less,
Al: 0.25 to 1.8%,
Mo: 0.05 to 0.35%,
N: 0.010% or less,
Ti: 0.0002% or less,
Nb: 0.01 to 0.3%,
V: 0.01 to 0.3%,
Cu: 1% or less,
Ni: 1% or less,
Cr: 1% or less,
B: 0.0001 to 0.0030%, and
a balance of Fe and unavoidable impurities,
the method comprising the steps of:
hot rolling the slab to make a steel sheet, coiling the sheet at a temperature of 400 to 750° C., cold rolling the sheet, annealing the cold rolled sheet by a continuous annealing process at a temperature of 680 to 930° C., overaging the annealed sheet at a temperature of 300 to 500° C. for 60 seconds to 20 minutes, cooling the overaged sheet to the martensite transformation point or less, heating the cooled sheet to 250 to 600° C., then hot dip galvanizing the heated sheet,
wherein the hot dip galvanized sheet has by area percent, 3.5% to 10% of tempered martensite, and by volume percent, 7% or more of residual austenite.

* * * * *